US012774426B2

(12) United States Patent
Augustine et al.

(10) Patent No.: US 12,774,426 B2
(45) Date of Patent: Oct. 27, 2026

(54) MIXED MEMBRANE-TYPE PROCESS FOR FUEL GAS UPGRADING

(71) Applicant: Air Liquide Advanced Technologies U.S. LLC, Houston, TX (US)

(72) Inventors: Alexander S. Augustine, Newark, DE (US); Nagaraju Palla, Houston, TX (US); Paul Terrien, Syracuse, NY (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 191 days.

(21) Appl. No.: 18/902,155

(22) Filed: Sep. 30, 2024

(65) Prior Publication Data

US 2026/0092229 A1 Apr. 2, 2026

(51) Int. Cl.
*B01D 53/22* (2006.01)
*C10L 3/10* (2006.01)

(52) U.S. Cl.
CPC .............. *C10L 3/103* (2013.01); *B01D 53/22* (2013.01); *C10L 3/104* (2013.01); *B01D 2256/245* (2013.01); *B01D 2257/304* (2013.01); *B01D 2257/702* (2013.01); *B01D 2257/7022* (2013.01); *C10L 2290/06* (2013.01); *C10L 2290/548* (2013.01)

(58) Field of Classification Search
CPC ...... C10L 3/103; C10L 3/104; C10L 2290/06; C10L 2290/548; C10L 2290/58; C10L 2290/60; B01D 53/22; B01D 53/221; B01D 53/223; B01D 53/225; B01D 53/227; B01D 53/229; B01D 2256/245; B01D 2257/304; B01D 2257/504; B01D 2257/702; B01D 2257/7022
See application file for complete search history.

(56) References Cited

U.S. PATENT DOCUMENTS 6,630,011 B1 * 10/2003 Baker .................. B01D 53/225 95/47
9,221,730 B2 12/2015 Lokhandwala et al.
(Continued)

FOREIGN PATENT DOCUMENTS

CA 3 043 460 5/2018
WO WO 2013 032868 3/2013

*Primary Examiner* — In Suk C Bullock
*Assistant Examiner* — Jason Y Chong
(74) *Attorney, Agent, or Firm* — Yan Jiang

(57) ABSTRACT

A mixed membrane system for producing a conditioned fuel gas from a high-pressure raw fuel gas that contains methane, $CO_2$, $H_2S$, $N_2$, ethane, propane, and heavy hydrocarbons, the system comprising a pre-heater, configured to temperature control the high-pressure raw fuel gas forming a feed fuel gas; a gas splitter, configured to split the feed fuel gas into a first and a second feed gases; a glassy membrane device, configured to reject $CO_2$ and/or $H_2S$ from the first feed gas while retaining methane and heavy hydrocarbons therein as a first conditioned fuel gas; and a rubbery membrane device, arranged in parallel with the glass membrane, configured to reject $CO_2$, $H_2S$, and heavy hydrocarbons from the second feed gas while retaining methane therein as a second conditioned fuel gas, wherein the first and second conditioned fuel gases are combined to form the conditioned fuel gas.

18 Claims, 1 Drawing Sheet

(56) References Cited

U.S. PATENT DOCUMENTS

| | | | |
|---|---|---|---|
| 10,569,218 B2 | 2/2020 | Liu | |
| 2013/0014643 A1 | 1/2013 | Lokhandwala et al. | |
| 2015/0059577 A1 | 3/2015 | Lokhandwala | |
| 2017/0157556 A1 | 6/2017 | Karode et al. | |
| 2018/0126328 A1 | 5/2018 | Zhou et al. | |
| 2018/0133644 A1* | 5/2018 | Liu | C08J 7/0427 |
| 2019/0030482 A1* | 1/2019 | Ding | B01D 71/5211 |
| 2024/0131469 A1* | 4/2024 | Foody | B01D 53/22 |

* cited by examiner

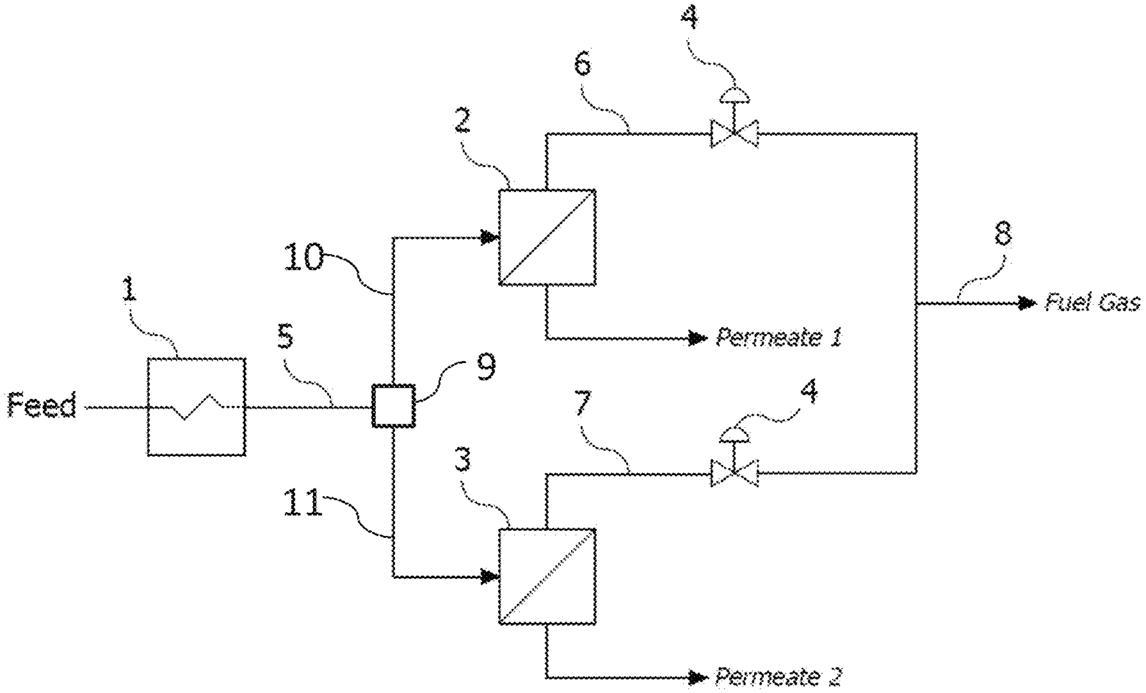
Feed
1
5
9
10
11
2
3
6
7
4
4
8
Fuel Gas
Permeate 1
Permeate 2

MIXED MEMBRANE-TYPE PROCESS FOR FUEL GAS UPGRADING

TECHNICAL FIELD

The present invention relates to a mixed membrane system and process for upgrading a raw fuel gas that contains methane, $CO_2$, $H_2S$, $N_2$, ethane, propane, and heavy hydrocarbons, to a conditioned fuel gas, in particular, to a system and process that contains a combination of rubbery and glassy membranes used in parallel.

BACKGROUND

In many oil & gas upstream operations, a fuel gas is required to operate gas engines or gas turbines at a facility. While usually the facility produces hydrocarbons that may be used for that purpose. There are some requirements to be met before being able to use some raw gas as fuel. In a lot of situations the raw gas may contain impurities such as $CO_2$, $H_2S$, $H_2O$, $N_2$ and heavy hydrocarbons.

Several examples of membrane systems for fuel gas conditioning have been disclosed previously.

US20170157556A1 discloses a membrane process consisting of one stage of rubbery membranes optimized to reject heavy hydrocarbons followed by one state of glassy membranes to reject $CO_2$. While this system may achieve fuel gas conditioning from rich, $CO_2$ laden gas, it requires numerous unit operations for applicability to small scale fuel gas conditioning.

CA3043460A1 discloses a membrane process consisting of two membrane stages where the high pressure residue from the first stage is passed to the second stage and the high pressure residue from the second stage is the product. The process is disclosed specifically to reject both $CO_2$ and $N_2$. Numerous process configurations are presented which include permeate recompression and recycle, however none are applicable to a small scale fuel gas generation.

US20180126328A1 discloses a membrane process and corresponding compact device which takes a rich, $CO_2$-laden gas and generates a lean, $CO_2$-depleted fuel gas. The first membrane stage rejects $CO_2$ in the low pressure stream while retaining methane and heavy hydrocarbons, the second membrane stage generates a low pressure methane stream in the low pressure permeate while retaining heavy hydrocarbons in the residue. The low pressure permeate stream from the second stage is good quality fuel gas. The drawback of the process is low productivity of fuel gas per membrane element.

U.S. Pat. No. 9,221,730B2 and US20130014643A1 both disclose a membrane process utilizing a glassy polymer membrane to preferentially permeate a lean methane stream for use as fuel gas. The membrane is operated at a very low stage cut such that the high pressure residue stream is still of suitable composition for sale to a pipeline.

US20150059577A1 discloses a membrane process and corresponding compact device which takes a raw heavy hydrocarbon rich gas stream. The device includes an integral filter element, allows for liquid drainage, and multiple stages of membrane elements. The scope of the invention is the compact device and is not specific to any particular membrane arrangement or application.

WO2013/032868 discloses a compact device to house both a pre-filter and a glassy polymer membrane. The device accepts raw natural gas and permeates a methane-rich fuel gas stream.

U.S. Pat. No. 10,569,218 discloses a membrane process for the simultaneous removal of $N_2$ and $CO_2$ from a natural gas stream using a combination of glassy and rubbery polymer membranes. The two membrane types are arranged in series with the high pressure residue gas from the $1^{st}$ stage, being fed to the $2^{nd}$ stage.

A natural gas stream that is both in high acid gas ($CO_2$ and/or $H_2S$) and rich in heavy hydrocarbons cannot be applied to a gas engine until it is made:

1. High enough HHV to combust in a proper way in a gas engine (done via $CO_2$ removal); and
2. Containing a low enough amount of heavy hydrocarbons to have an acceptable methane number for a gas engine (done by heavy hydrocarbons removal). Generally the traditional solution to the problem would be:
   - Use of a glassy membrane alone: with this solution, while removing $CO_2$, the heavy hydrocarbons will accumulate on the residue side could cause engine mal-performance and reduce the life of the engine; and
   - Use of a rubbery membrane alone: with this solution, large amounts of hydrocarbons will be removed along with the $CO_2$. This may result in an overly lean gas composition which may cause engine mal-performance and potential for stalling.
3. Containing a low enough amount of $H_2S$ to both avoid internal corrosion to the engine and meet applicable emission standards. Similarly to the previous point, the use of either a glassy or rubbery membrane alone would remove $H_2S$, but result in a fuel gas composition which is either excessively rich or excessively lean respectively.

Use of a rubbery membrane first and in series of that first stage on the residue side use of a glassy membrane, e.g., US20170157556A1, which does not allow easily controlling each condition independently to achieve a balanced gas composition. Thus, new approaches are demanded.

SUMMARY

There is disclosed a mixed membrane system for producing a conditioned fuel gas from a high-pressure raw fuel gas that contains methane, $CO_2$, $H_2S$, $N_2$, ethane, propane, and heavy hydrocarbons, the system comprising

- a pre-heater, configured to temperature control the high-pressure raw fuel gas forming a feed fuel gas;
- a gas splitter, configured to split the feed fuel gas into a first and a second feed gases;
- a glassy membrane device, configured to reject $CO_2$ and/or $H_2S$ from the first feed gas while retaining methane and heavy hydrocarbons therein as a first conditioned fuel gas; and
- a rubbery membrane device, arranged in parallel with the glass membrane, configured to reject $CO_2$, $H_2S$, and heavy hydrocarbons from the second feed gas while retaining methane therein as a second conditioned fuel gas, wherein the first and second conditioned fuel gases are combined to form the conditioned fuel gas.

In some embodiments, further comprising a flow restricting valve along the first and second conditioned fuel gas streams, respectively, before the first and second conditioned fuel gas streams are mixed, each flow restricting valve configured to adjust a proportion of the first and second conditioned fuel gases to generate the conditioned fuel gas and fine-tune a heating value for a gas engine that will use the conditioned fuel gas.

In some embodiments, the pressure of the high-pressure and temperature controlled feed flow ranges from 15-80 barg.

In some embodiments, the pressure of the high-pressure and temperature controlled feed flow is 50 barg.

In some embodiments, the temperature of the high-pressure and temperature controlled feed flow ranges from 20° C. to 60° C.

In some embodiments, the temperature of the high-pressure and temperature controlled feed flow is 35° C.

In some embodiments, the glassy membrane device is composed of a single membrane element or multiple membrane elements in parallel, wherein the membrane elements employed in the glassy membrane device is hollow-fiber or spiral wound in construction, wherein the glassy membrane device is self-supported or has a composite structure with a thin, dense separating layer supported on a porous substructure.

In some embodiments, the rubbery membrane device is composed of a single membrane element or multiple membrane elements in parallel, wherein the membrane elements employed in the rubbery membrane device is hollow-fiber or spiral wound in construction, wherein the rubbery membrane is self-supported or has a composite structure with a thin, dense separating layer supported on a porous substructure.

In some embodiments, polymer materials in the glassy membrane device and rubbery membrane device are different.

In some embodiments, the glassy membrane device is a Medal PIX membrane.

In some embodiments, the rubbery membrane device is a Porogen P-guard membrane.

In some embodiments, a number of membrane elements and a geometric design of each membrane element with the glassy membrane device and the rubbery membrane device are not limited.

In some embodiments, a pressure of the high-pressure raw natural gas ranges from 15 to 80 barg.

In some embodiments, a pressure of the high-pressure raw natural gas is 50 barg.

In some embodiments, a high pressure residue stream from the glassy membrane device is rich in heating value.

In some embodiments, a high pressure residue stream from the rubbery membrane device is lean in heating value.

In some embodiments, the conditioned fuel gas is balanced in terms of heating value for optimal operation of a gas engine.

In some embodiments, a ratio of the first and second feed gases sent to the rubbery and glassy membrane devices affects a heating value of the conditioned fuel gas.

In some embodiments, if the first feed gas sent to the glassy membrane is greater than the second feed gas sent to the rubbery membrane, the conditioned fuel gas will be rich with a heating value exceeding 1,200 BTU/SCF.

In some embodiments, if the second feed gas sent to the rubbery membrane is greater than the first feed gas sent to the glassy membrane, the fuel gas will be lean, with a heating value less than 900 BTU/SCF.

There is disclosed a process for producing a conditioned fuel gas from a high-pressure raw fuel gas that contains methane, $CO_2$, $H_2S$, $N_2$, ethane, propane, and heavy hydrocarbons, the process comprising the steps of:

a) re-directing a portion of the high-pressure raw natural gas;

b) optimizing a heat-exchanger;

c) feeding the high-pressure raw natural gas to the heat-exchanger and forming a high-pressure and temperature controlled feed flow;

d) splitting the high-pressure and temperature controlled feed flow into a first high-pressure and temperature controlled feed flow stream and a second high-pressure and temperature controlled feed flow stream and feeding the first and second high-pressure and temperature controlled feed flows to a glassy membrane and a rubbery membrane, respectively;

e) removing a portion of $CO_2$ and $H_2S$ contents to a permeate side in the glassy membrane and while retaining methane and heavy hydrocarbons therein as a first conditioned fuel gas;

f) removing a portion of $CO_2$, $H_2S$ and heavy hydrocarbons to a permeate side in the rubbery membrane and while retaining methane therein as a second conditioned fuel gas;

g) controlling a balance of the first and second high-pressure and temperature controlled feed flows from the glassy and rubbery membranes, respectively, through using flow restricting valves installed along the first and second high-pressure and temperature controlled feed flows; and h) re-directing and combining the treated first and second high-pressure and temperature controlled feed flow streams at steps d) and e) to meet a desired fuel gas specification of the conditioned fuel gas.

In some embodiments, the pressure of the high-pressure and temperature controlled feed flow ranges from 15-80 barg.

In some embodiments, the pressure of the high-pressure and temperature controlled feed flow is 50 barg.

In some embodiments, the temperature of the high-pressure and temperature controlled feed flow ranges from 20° C. to 60° C.

In some embodiments, the temperature of the high-pressure and temperature controlled feed flow is 35° C.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a block diagram of an exemplary embodiment of a mixed membrane-type system for fuel gas upgrading in accordance with the present invention.

DESCRIPTION OF PREFERRED EMBODIMENTS

Disclosed is a mixed membrane system for fuel gas upgrading and method of using the same. More specifically, the disclosed is also a process for fuel gas conditioning with a combination of rubbery and glassy membranes. The rubbery and glassy membranes are arranged in parallel where a feed gas is split and sent partially to the rubbery membrane and partially to the glassy membrane, respectively. Upstream of the membranes, a single preheater may be used to establish suitable operating conditions for both membranes. The suitable operation conditions for both membranes include a pressure of an incoming feed gas ranging from 15-80 barg, preferably 50 barg, a temperature of the incoming feed gas ranging from 20° C. to 60° C., preferably 35° C., downstream of the single preheater. Downstream of the membranes, high pressure residue streams (the pressure is slightly lower than the incoming feed gas) from the membranes are mixed and used for fuel gas for a gas engine or turbine. The proportion of gas sent to either the rubbery or glassy membranes will affect a heating value of the fuel gas. If a greater portion of the feed gas is sent to the rubbery membrane, the fuel gas will be lean, with a heating value less than 900 BTU/SCF (British thermal unit per standard cubic foot). If a greater portion of the feed gas is sent to the glassy membrane, the fuel gas will be rich, with a heating value exceeding 1,200 BTU/SCF. The disclosed mixed membrane system may be an optimal solution to treat a fuel gas that may contain impurities, such as $CO_2$, $H_2S$, $H_2O$, $N_2$ and heavy hydrocarbons, to achieve an acceptable fuel gas specification to improve gas engines and turbine reliability. Furthermore, the disclosed mixed membrane system is a flexible and customizable solution for conditioning of the fuel gas to meet desired requirements of gas turbines, engines, compressors and burners of different manufacturers and systems.

In some embodiments, the disclosed mixed membrane system includes two types of membranes that are used in parallel. A glassy polymer membrane is used to reject $CO_2$ from a gas stream. This results in a $CO_2$-depleted, hydrocarbon rich residue stream, which has a lower heating value (LHV) too high for use in a gas engine. In parallel, a rubbery polymer membrane is also used to reject $CO_2$ from the gas stream. This results in a $CO_2$-depleted, hydrocarbon lean residue stream which has an LHV value too low for use in a gas engine. If a feed gas has a second inert component, rubbery membrane may generate a too lean residue stream with LHV value of <900 BTU/SCF. If the feed gas has no additional inert component, combination of the glassy and rubbery membranes may generate a usable fuel gas stream with higher hydrocarbon recovery than the rubbery membrane alone.

An embodiment of the disclosed mixed membrane system is shown in FIG. 1. First, a feed stream or a feed gas stream or a feed fuel gas stream goes to feed preheater 1 that is temperature controlled. Here the feed gas stream may be a high-pressure raw natural gas that may contain methane, $CO_2$, $H_2S$, $N_2$, ethane, propane, and/or heavy hydrocarbons (e.g., $C_4$+ hydrocarbons), and the like. The high-pressure raw natural gas may be from a natural gas wellhead that is high-pressured or from an upstream compressor. The pressure range for the high-pressure raw natural gas may be from 15-80 barg, preferably 50 barg. The pressure of the high-pressure raw natural gas may be formed by a gradual pressurization process at a rate of 10 bar/min or less, preferably 5 bar/min. The feed gas stream may be any other streams containing above gaseous components, such as, methane, $CO_2$, $H_2S$, $N_2$, ethane, propane, and/or heavy hydrocarbons (e.g., $C_4$+ hydrocarbons). Feed preheater 1 may be any commercially available heating devices such as a shell and tube heat exchanger or an electric heater. Conditioned feed gas stream 5 out of feed preheater 1 is then split into two streams 10 and 11 with splitter 9 to feed two different membrane devices 2 and 3, respectively. Splitter 9 may be a T-type splitter and may or may not be controlled with a gas valve (not shown). A certain ratio of streams 10 and 11 may be provided with splitter 9. Numeral 2 is a glassy polymeric membrane device which preferentially rejects $CO_2$ and $H_2S$ while retaining methane and heavy hydrocarbons. The high pressure residue stream from glassy polymeric membrane 2 is rich in heating value. Numeral 3 represents a rubbery polymeric membrane device which preferentially rejects $CO_2$, $H_2S$, and heavy hydrocarbons while retaining methane. The high pressure residue stream from rubbery polymeric membrane 3 is lean in heating value. The two residue streams, glassy membrane residue stream 6 and rubbery polymeric membrane residue stream 7 from membrane devices 2 and 3, respectively, are combined to generate a mixed fuel gas stream 8, which is balanced in terms of heating value for optimal operation of a gas engine. Restriction valves or flow control valves 4 may be used to adjust the proportion of lean and rich gas supplied to generate stream 8 and therefore fine-tune the heating value for a particular gas engine.

Glassy polymeric membrane device 2 may be composed of a single membrane element or multiple membrane elements in parallel. The membrane elements employed may be hollow-fiber or spiral wound in construction. Glassy polymeric membrane 2 may be self-supported or may have a composite structure with a thin, dense separating layer supported on a porous substructure.

Rubbery polymeric membrane device 3 may be composed of a single membrane element or multiple membrane elements in parallel. The membrane elements employed may be hollow-fiber or spiral wound in construction. Rubbery polymeric membrane 3 may be self-supported or may have a composite structure with a thin, dense separating layer supported on a porous substructure.

Glassy polymeric membrane device 2 and rubbery polymeric membrane device 3 have different polymer materials which function differently. Practical examples of these are Medal PIX membrane (glassy) and Porogen P-guard membrane (rubbery). The number of membrane elements and the geometric design of each membrane element with glassy polymeric membrane device 2 and rubbery polymeric membrane device 3 are not limited.

The disclosed also includes a process for fuel gas conditioning or upgrading with a combination of glassy and rubbery membranes. Here a feed fuel gas stream may be a high-pressure raw natural gas that may contain methane, $CO_2$, $H_2S$, $N_2$, ethane, propane, and/or heavy hydrocarbons (e.g., $C_4$+ hydrocarbons). The pressure range for the high-pressure raw natural gas may be from 15-80 barg, preferably 50 barg. The feed fuel gas stream may be any other stream containing above gaseous components, methane, $CO_2$, $H_2S$, $N_2$, ethane, propane, heavy hydrocarbons (e.g., $C_4$+ hydrocarbons), and the like.

The disclosed process for updating a high-pressure raw natural gas from a natural gas wellhead or from an upstream compressor comprises the following steps:

a) re-directing a portion of the high-pressure raw natural gas;
b) optimizing a heat-exchanger;
c) feeding the high-pressure raw natural gas to the heat-exchanger and forming a high-pressure and temperature controlled feed flow, wherein the pressure range for the high-pressure and temperature controlled feed flow is from 15-80 barg, preferably 50 barg, the temperature of the high-pressure and temperature controlled feed flow ranges from 20° C. to 60° C., preferably 35° C.;
d) splitting the high-pressure and temperature controlled feed flow into a first high-pressure and temperature controlled feed flow stream and a second high-pressure and temperature controlled feed flow stream and feeding the first and second high-pressure and temperature controlled feed flow streams into two sets of membranes comprising of glassy and rubbery membranes, respectively;

e) removing a portion of $CO_2$ content to a permeate side in the glassy membrane and depleting $CO_2$ content in the first high-pressure feed flow stream;

f) removing a portion of $CO_2$ and $C_4$+ hydrocarbons to a permeate side in the rubbery membrane and depleting $CO_2$ and hydrocarbons in the second high-pressure feed flow stream;

g) controlling a balance of the first and second high-pressure and temperature controlled feed flow streams from the glassy and rubbery membranes, respectively, through using flow restricting valves; and h) re-directing and combining the treated first and second high-pressure and temperature controlled feed flow streams at steps d) and e) to meet a desired fuel gas specification.

The disclosed process and membrane system is used for fuel gas upgrading for prime movers, such as engines, turbines, compressors etc.

The disclosed process and membrane system may also include:

a) a portion of $H_2S$ content is removed to the permeate side in the glassy membrane and $H_2S$ is depleted in the high-pressure and temperature controlled treated gas; and b) a portion of $H_2S$ and $C_4$+ hydrocarbons is removed to the permeate side in the rubbery membrane and a depleted $H_2S$ and hydrocarbon stream in the high pressure treated gas.

The disclosed process and membrane system may be applied to remove a sour gas $CO_2$ and/or $H_2S$.

EXAMPLES

The following non-limiting examples are provided to further illustrate embodiments of the invention. However, the examples are not intended to be all-inclusive and are not intended to limit the scope of the inventions described herein.

Referring to FIG. 1, Table 1 summarizes heat and mass balance of a process applied to a typical raw natural gas stream in which a portion of $CO_2$ content was removed. As shown, the resulting $CO_2$ content in mixed fuel gas 8 is much lower than that of in feed gas 5.

TABLE 1

| | Feed gas 5 | Glassy membrane residue 6 | Rubbery membrane residue 7 | Mixed fuel gas 8 |
|---|---|---|---|---|
| Temperature [° C.] | 60.0 | 50.4 | −2.9 | 30.3 |
| Pressure [bar_g] | 41.8 | 41.7 | 41.6 | 41.6 |
| Mass Flow [lb/hr] | 29,516 | 6,333 | 4,174 | 10,506 |
| HHV [Btu/SCF] | 953 | 1,278 | 866 | 1,096 |
| Mole Frac ($CO_2$) | 0.2000 | 0.0296 | 0.0290 | 0.0293 |
| Mole Frac (Methane) | 0.5613 | 0.6573 | 0.7099 | 0.6805 |
| Mole Frac (Ethane) | 0.0674 | 0.0979 | 0.0452 | 0.0746 |
| Mole Frac (Propane) | 0.0542 | 0.0884 | 0.0237 | 0.0598 |
| Mole Frac (i-Butane) | 0.0068 | 0.0112 | 0.0015 | 0.0069 |
| Mole Frac (n-Butane) | 0.0162 | 0.0267 | 0.0020 | 0.0158 |
| Mole Frac (i-Pentane) | 0.0043 | 0.0071 | 0.0001 | 0.0040 |
| Mole Frac (n-Pentane) | 0.0041 | 0.0069 | 0.0004 | 0.0040 |
| Mole Frac (n-Hexane) | 0.0029 | 0.0049 | 0.0001 | 0.0028 |
| Mole Frac (n-Heptane) | 0.0026 | 0.0044 | 0.0002 | 0.0026 |
| Mole Frac (n-Octane) | 0.0000 | 0.0000 | 0.0000 | 0.0000 |
| Mole Frac (n-Nonane) | 0.0000 | 0.0000 | 0.0000 | 0.0000 |
| Mole Frac (Nitrogen) | 0.0784 | 0.0657 | 0.1841 | 0.1180 |

Reference herein to "one embodiment" or "some embodiments" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used herein, the indefinite article "a" or "an" means one or more.

As used herein, "about" or "around" or "approximately" in the text or in a claim means±10% of the value stated.

The term "ambient pressure" refers to an environment pressure approximately 1 atm or 1 bara.

The term "sour gas" or "sour NG" refers to natural gas that contains significant amounts of hydrogen sulfide ($H_2S$) and/or carbon dioxide ($CO_2$).

The term "heavy hydrocarbons" refers to $C_4$+ hydrocarbons, or the like.

The standard abbreviations of the elements from the periodic table of elements are used herein. It should be understood that elements may be referred to by these abbreviations (e.g., S refers to sulfur, N refers to nitrogen, O refers to oxygen, C refers to carbon, etc.).

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Ranges may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

While embodiments of this invention have been shown and described, modifications thereof may be made by one skilled in the art without departing from the spirit or teaching of this invention. The embodiments described herein are exemplary only and not limiting. Many variations and modifications of the composition and method are possible and within the scope of the invention. Accordingly, the scope of protection is not limited to the embodiments described herein, but is only limited by the claims which follow, the scope of which shall include all equivalents of the subject matter of the claims.

We claim:

1. A mixed membrane system for producing a conditioned fuel gas from a raw fuel gas that contains methane, $CO_2$, $H_2S$, $N_2$, ethane, propane, and heavy hydrocarbons, the system comprising:

a pre-heater, configured to temperature control the raw fuel gas forming a feed fuel gas;

a gas splitter, configured to split the feed fuel gas into a first and a second feed gases;

a glassy membrane device, configured to remove $CO_2$ and/or $H_2S$ from the first feed gas while retaining methane and heavy hydrocarbons therein as a first conditioned fuel gas;

a rubbery membrane device, arranged in parallel with the glassy membrane device, configured to remove $CO_2$, $H_2S$, and heavy hydrocarbons from the second feed gas while retaining methane therein as a second conditioned fuel gas, wherein the first and second conditioned fuel gases are combined to form the conditioned fuel gas; and flow restricting valves along the first and second conditioned fuel gas streams, respectively, before the first and second conditioned fuel gas streams are mixed, each flow restricting valve configured to adjust a proportion of the first and second conditioned fuel gases to generate the conditioned fuel gas and fine-tune a heating value for a gas engine that will use the conditioned fuel gas.

2. The mixed membrane system of claim 1, wherein a pressure of the feed fuel gas ranges from 15-80 barg.

3. The mixed membrane system of claim 1, wherein a pressure of the feed fuel gas is 50 barg.

4. The mixed membrane system of claim 1, wherein a temperature of the feed fuel gas ranges from 20° C. to 60° C.

5. The mixed membrane system of claim 1, wherein a temperature of the feed fuel gas is 35° C.

6. The mixed membrane system of claim 1, wherein a pressure of the raw natural gas ranges from 15 to 80 barg.

7. The mixed membrane system of claim 1, wherein the glassy membrane device and the rubbery membrane device each are composed of a single membrane element or multiple membrane elements in parallel, wherein the membrane elements employed in both membrane devices are hollow-fiber or spiral wound in construction, wherein both membrane devices are self-supported or have a composite structure with a thin, dense separating layer supported on a porous substructure.

8. The mixed membrane system of claim 7, wherein polymer materials in the glassy membrane device and rubbery membrane device are different.

9. The mixed membrane system of claim 7, wherein a number of membrane elements and a geometric design of each membrane element with the glassy membrane device and the rubbery membrane device are not limited.

10. A process for producing a conditioned fuel gas from a raw fuel gas that contains methane, $CO_2$, $H_2S$, $N_2$, ethane, propane, and heavy hydrocarbons, the process comprising the steps of:

feeding the raw natural gas to a heat-exchanger and forming a temperature controlled feed flow;

splitting the temperature controlled feed flow into a first temperature controlled feed flow stream and a second temperature controlled feed flow stream and feeding the first and second temperature controlled feed flows to a glassy membrane and a rubbery membrane, respectively;

removing a portion of $CO_2$ and $H_2S$ contents to a permeate side in the glassy membrane while retaining methane and heavy hydrocarbons therein as a first conditioned fuel gas;

removing a portion of $CO_2$, $H_2S$ and heavy hydrocarbons to a permeate side in the rubbery membrane while retaining methane therein as a second conditioned fuel gas;

controlling a balance of the first and second temperature controlled feed flows from the glassy and rubbery membranes, respectively, through using flow restricting valves installed along the first and second temperature controlled feed flows; and re-directing and combining the first and second conditioned fuel gases to form the conditioned fuel gas that meets a desired fuel gas specification.

11. The process of claim 10, wherein a pressure of the temperature controlled feed flow ranges from 15-80 barg.

12. The process of claim 10, wherein a temperature of the temperature controlled feed flow ranges from 20° C. to 60° C.

13. The process of claim 10, wherein a temperature of the temperature controlled feed flow is 35° C.

14. The process of claim 10, wherein the first conditioned fuel gas from the glassy membrane device has a higher heating value than the second conditioned fuel gas from the rubbery membrane device.

15. The process of claim 10, wherein the conditioned fuel gas is balanced in terms of heating value for optimal operation of a gas engine.

16. The process of claim 10, wherein a ratio of the first and second temperature controlled feed flows sent to the rubbery and glassy membranes affects a heating value of the conditioned fuel gas.

17. The process of claim 16, wherein if the first temperature controlled feed flow sent to the glassy membrane is greater than the second temperature controlled feed flow sent to the rubbery membrane, the conditioned fuel gas will be rich with a heating value exceeding 1,200 BTU/SCF.

18. The process of claim 16, wherein if the second temperature controlled feed flow sent to the rubbery membrane is greater than the first temperature controlled feed flow sent to the glassy membrane, the conditioned fuel gas will be lean, with a heating value less than 900 BTU/SCF.

* * * * *